United States Patent [19]

Van Ryswyk

[11] Patent Number: 4,683,815
[45] Date of Patent: Aug. 4, 1987

[54] BALER MACHINE WITH A BALE TRANSFER CONVEYOR

[75] Inventor: Wilbur Van Ryswyk, Pella, Iowa

[73] Assignee: Vermeer Manufacturing Co., Pella, Iowa

[21] Appl. No.: 727,793

[22] Filed: Apr. 26, 1985

[51] Int. Cl.⁴ .................. B30B 5/06; B30B 15/32
[52] U.S. Cl. ...................... 100/88; 56/341; 100/188 R; 198/318; 414/24.5; 414/519; 414/528
[58] Field of Search ........ 100/88, 89, 188 R, 188 BT; 56/341, 343, 344, 345, 346, 350, 351; 414/24.5, 24.6, 502, 505, 519, 527, 528; 198/318, 592

[56] References Cited

U.S. PATENT DOCUMENTS

| | | | |
|---|---|---|---|
| 2,589,837 | 3/1952 | McAlpine et al. | 100/88 X |
| 2,613,591 | 10/1952 | Bruns et al. | 100/88 |
| 3,931,702 | 1/1976 | Soteropulos et al. | 100/88 X |
| 3,974,632 | 8/1976 | Van der Lely | 100/88 X |
| 4,162,135 | 7/1979 | Seymour | 100/188 X |
| 4,566,380 | 1/1986 | Clostemeyer et al. | 100/89 |

FOREIGN PATENT DOCUMENTS 3247661 6/1984 Fed. Rep. of Germany ........ 100/88

*Primary Examiner*—Peter Feldman
*Attorney, Agent, or Firm*—Rudolph L. Lowell

[57] ABSTRACT

A cylindrical bale forming machine has a bale transfer unit yieldably maintained in a transport or rest horizontal position located below the bale discharge gate to receive a bale discharged from the machine for transfer to a ground location rearwardly clear of the discharge gate. The transfer unit is operated in response to the movement of the discharge gate into its open or bale discharge position and is returned to its rest position in response to movement of the discharge gate out of the open position therefor.

1 Claim, 10 Drawing Figures

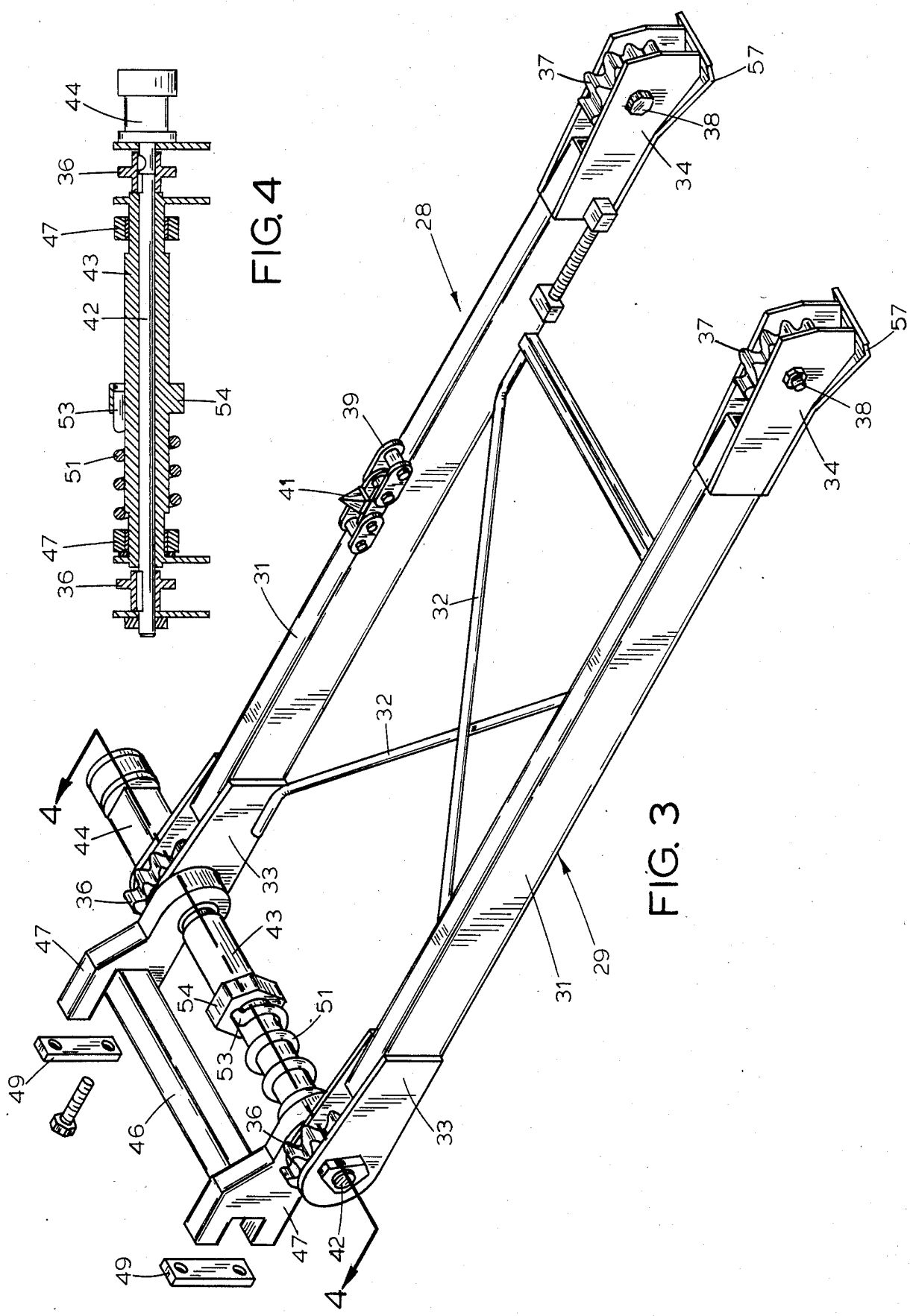

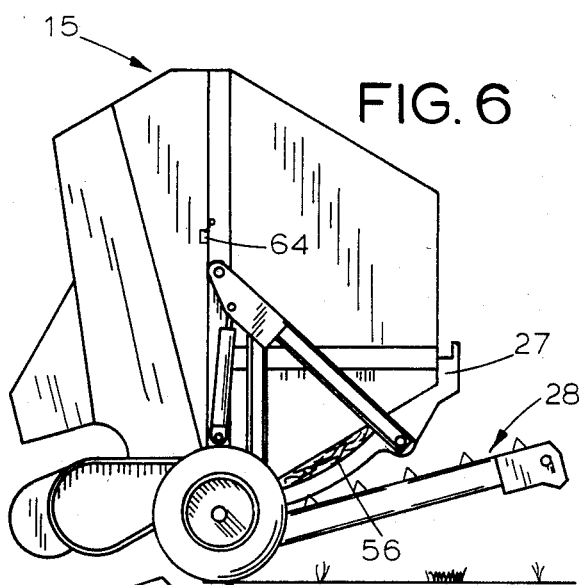
FIG. 6
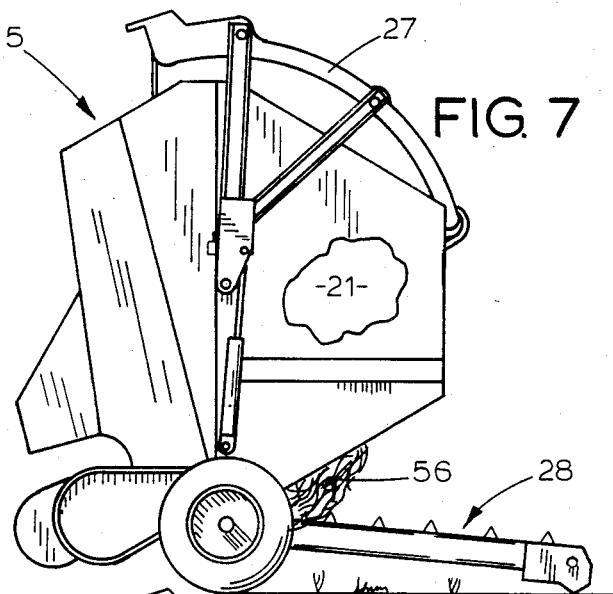
FIG. 7
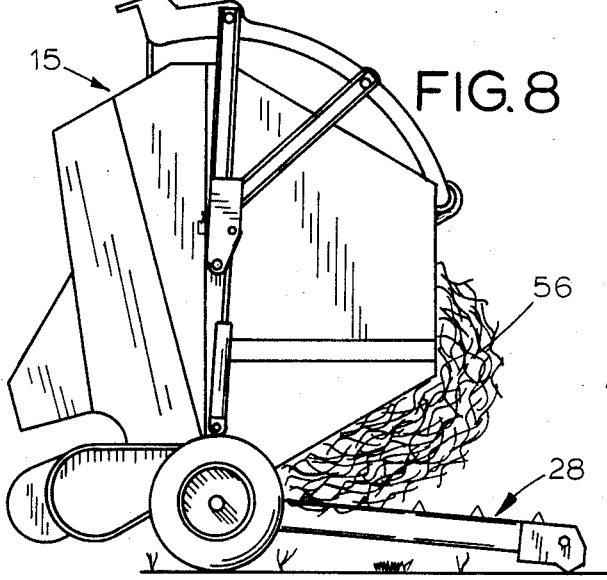
FIG. 8
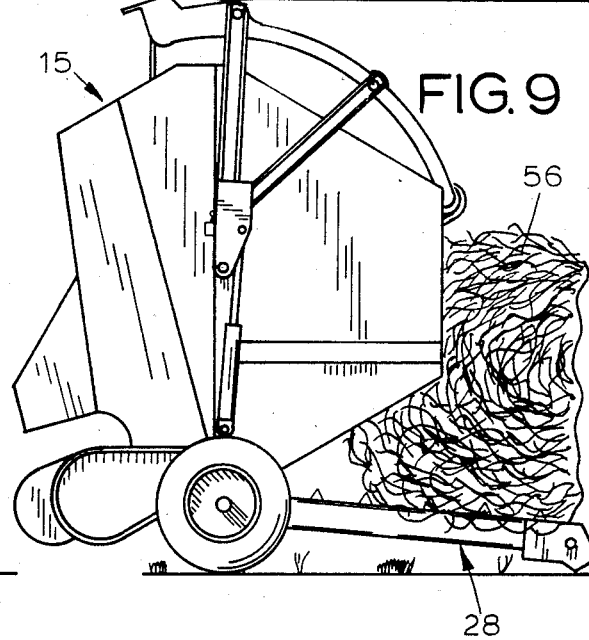
FIG. 9
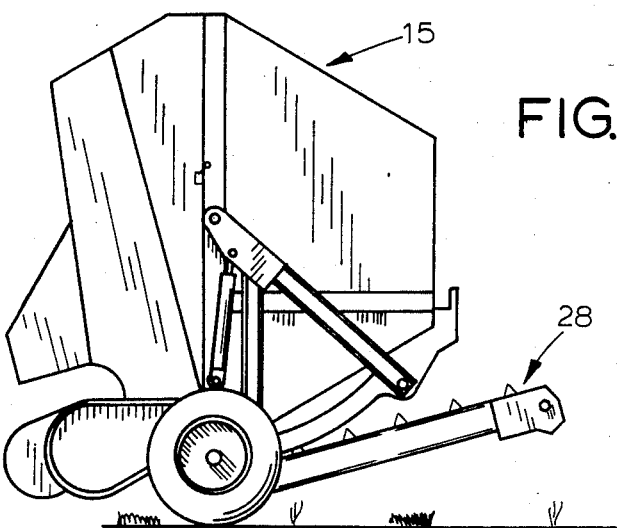
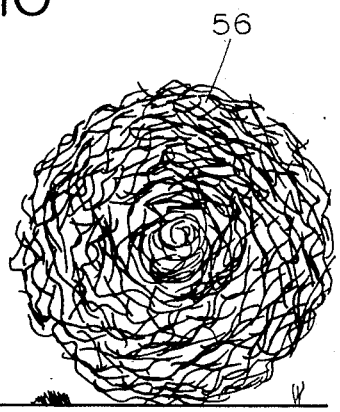
FIG. 10

BALER MACHINE WITH A BALE TRANSFER CONVEYOR

BACKGROUND OF THE INVENTION

This invention relates to a machine for forming large cylindrical bales of a windrowed crop material and more particularly to a conveyor unit which will deliver a bale, once it is discharged from the bale forming chamber, to a ground location rearwardly clear of the bale discharge gate.

In a usual bale discharge operation of a large bale forming machine the bale hits the ground adjacent the rear end of the machine so that insufficient clearance takes place between the bale and the open bale discharge gate. The bale thus interferes with the movement of the discharge gate to its closed position to define the bale forming chamber. Until the discharge gate is closed, any material supplied to the bale forming chamber passes through the chamber for discharge to the ground. It is necessary, therefore, that the machine be advanced a distance along a windrow to clear the gate for closing before another bale forming operation can be initiated. However, this procedure results in a portion of the windrowed material being lost in the field.

To overcome these problems, some baler machines have bale forming belts selectively controlled for a reverse rotational action on the bale to facilitate its discharge from the machine as exemplified in U.S. Pat. Nos. 4,208,862; 4,218,866; 4,258,619; 4,262,478; 4,296,596; 4,238,919 and 4,393,764. Other baler machines utilize kicker mechanisms for propelling the bale to a location rearwardly of the machine as disclosed in U.S. Pat. Nos. 4,206,587; 4,406,221; and 4,458,587. In U.S. Pat. No. 4,402,176, the tail or discharge gate is movable forwardly and upwardly to a bale discharge position so as to be clear of the bale when it is dropped from the machine.

In the present invention, the baler machine is equipped with a bale conveyor unit that receives a bale discharged from the bale forming chamber and then automatically conveys the bale to a location rearwardly clear of the machine's discharge gate and out of the path of travel followed by the gate as it closes. The machine, therefore, can immediately initiate a next baling operation to eliminate material passing directly through an open bale forming chamber to the ground, and the necessity of the machine traveling over the windrowed material before the discharge gate can be moved to the closing position therefor without interference from the discharged bale.

SUMMARY OF THE INVENTION

The present invention provides a baler machine having an elongate bale conveying unit mounted thereon for receiving a bale discharged from the bale forming chamber of the machine and then automatically conveying the bale to a location rearwardly of the machine tail or discharge gate. The conveyor unit is of a simple construction and includes transversely spaced endless bale engaging means mounted for rotation longitudinally of the conveyor unit. The forward end of the conveyor unit is pivotally supported on the machine and projects rearwardly therefrom to underlie and then extend beyond the tail gate of the machine. The conveyor unit is yieldably urged to a substantially horizontal bale receiving position by a torsion spring means acting on the forward end of the conveyor unit which is then movable to a rearwardly and downwardly inclined bale discharge position by the weight of the discharged bale overcoming the force of the torsion spring means. The bale, on being engaged by the bale engaging means, is automatically moved rearwardly on the conveyor unit to a position rearwardly of the discharge gate. On release of the bale from the conveyor unit, the torsion spring means functions to automatically return the conveyor unit to its bale receiving position. A motor means on the conveyor unit for driving the bale engaging means is operated in response to the movement of the discharge gate to its open or bale discharge position. On movement of the tail gate out of the open position therefor, the motor means is automatically deactivated.

BRIEF DESCRIPTION OF THE DRAWINGS

FIG. 3 is an enlarged perspective view of the transfer unit with some parts shown exploded and others partially to more clearly show its construction;

FIG. 4 is a sectional view taken along line 4—4 in FIG. 3;

FIG. 6 is a diagrammatic view showing the rest or transport position of the bale transfer unit during a baling operation;

FIG. 7 illustrates diagrammatically the tail gate of the baler machine in its bale discharge position and with the bale in a dropped position, on the receiving or forward end of the transfer unit;

FIGS. 8 and 9 are diagrammatic views showing the progressive travel of a bale on the transfer unit rearwardly away from the baler; and FIG. 10 illustrates diagrammatically the release of the bale from the transfer unit to a ground location rearwardly clear of the tail gate and wherein the bale transfer unit has been returned to its rest position of FIG. 6 concurrently with the movement of the tail gate to its closed position.

DESCRIPTION OF THE INVENTION

Figure 1:
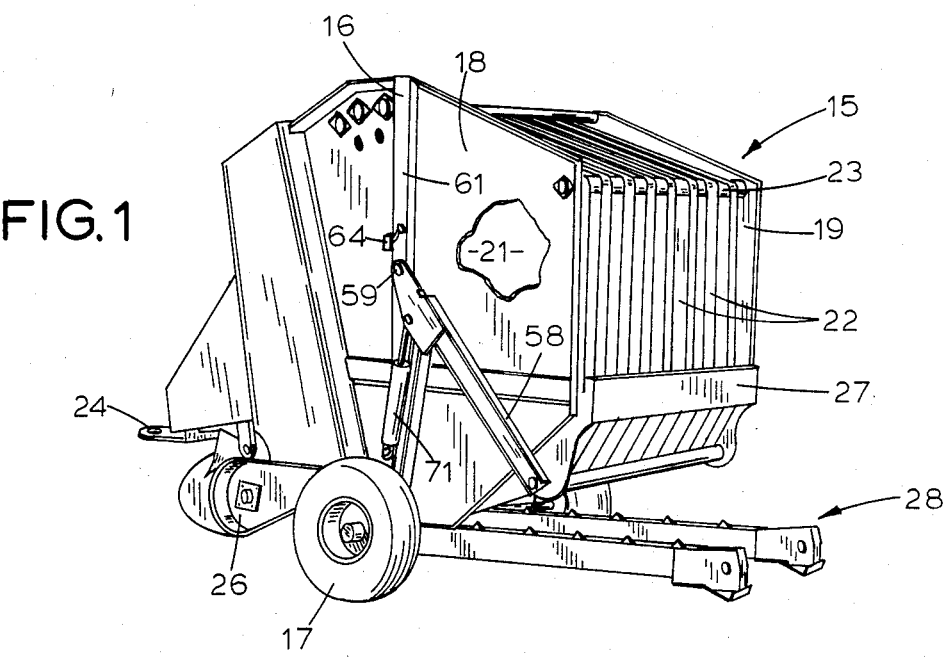
FIG. 1 is a perspective view of a round bale forming machine showing the bale transfer unit of this invention in assembly relation therewith.

The bale transfer unit of the present invention is incorporated in a bale forming machine, indicated generally as 15 in FIG. 1, for forming large cylindrical bales of hay or other fibrous crop materials. The machine 15 is similar to the baling machine shown and described in U.S. Pat. No. 4,172,354 and is incorporated herein by reference.

The machine 15 includes a main frame 16 mounted on a pair of ground wheels 17. The main frame 16 has a pair of upright spaced apart side walls 18 and 19 having a baling chamber 21 therebetween. Disposed between the opposite side walls 18 and 19 for upright longitudinal movement are a series of transversely spaced flat belts 22 trained about supporting rollers, one of which is shown at 23. A tongue structure 24 extends forwardly of the machine 15 for connection to a usual farm tractor (not shown) having a conventional rear power take off mechanism and equipped with a usual hydraulic pressure system. A pickup mechanism 26 of a conventional structure spans the width of the frame 16 forwardly of the baling chamber 21 to elevate the crop material from the field, as the machine 15 advances, and delivers such material rearwardly into the baling chamber.

In a usual bale forming operation, windrowed crop material is engaged and lifted by the rotating pickup mechanism 26 and moved rearwardly in a general mat form into the bale forming chamber 21. The round bale is progressively increased in size within the bale forming chamber 21 until it is fully formed. The advance of the machine 15 along the windrowed crop material is then halted to provide for twine from a twine supply mechanism (not shown) being wrapped about the bale to maintain its cylindrical form when later handled for feeding or storage purposes. The tail gate 27 is then opened to permit dropping of the bale to the ground from the bale forming chamber 21. Since the formed bale generally drops closely adjacent to the rear end of the machine 15, it is necessary that the operator advance the machine forwardly to a position wherein the tail gate 27 clears the bale in its movement to a closed position for the next baling operation. It is during this forward advance of the machine, when baling does not take place, that a portion of the windrowed material is left on the ground. To pick up such material, the machine, with the tail gate in closed position, must be reversed a distance providing for the material pick up in the initiation of the next bale forming operation.

Figure 2:
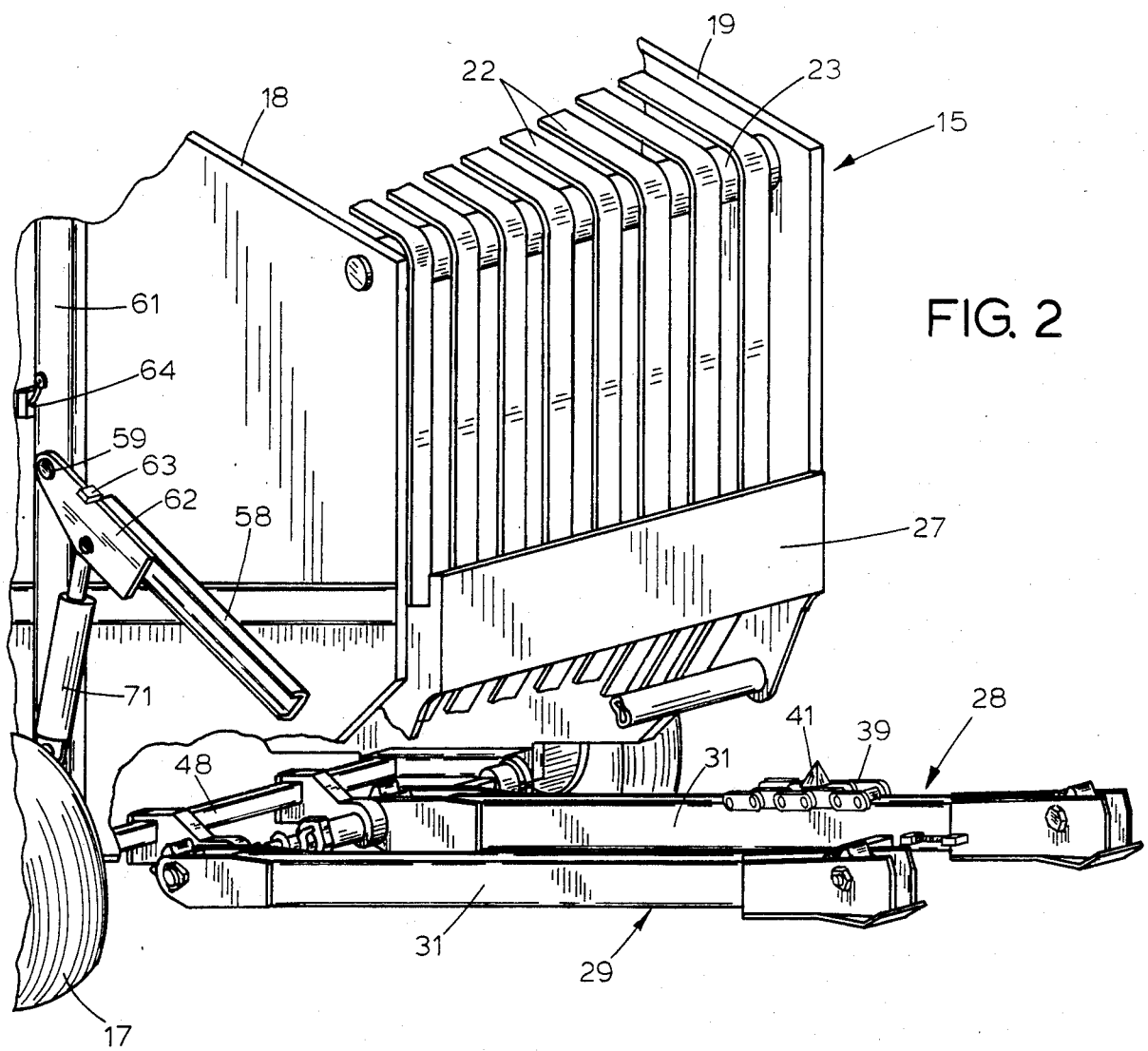
FIG. 2 is an enlarged detail rear perspective view of the baler and bale transfer unit assembly.

This inconvenience of advancing the machine to permit closing of the tail gate, and then reversing the machine to eliminate leaving crop material lying in the field, is eliminated by the bale transfer unit 28 of this invention. As shown in FIGS. 2 and 3, the transfer unit 28 includes an elongated main frame 29 having a pair of transversely spaced side tubular members 31 connected by brace members 32. The transfer unit 28 is pivotally supported at its front end on the machine 15 at a position adjacent to and rearwardly of the axes of the wheels 17 for extension rearwardly therefrom and below the tail gate 27. Each side frame member 31 includes a pair of upright forward extensions 33, and rearward extensions 34 for rotatably receiving therebetween front sprocket gears 36 and rear sprocket gears 37, respectively.

The front sprockets 36 are mounted on a drive shaft 42 (FIGS. 3 and 4) rotatable within a tubular member 43 connected to and extended between the inner ones of the front extension plates 33. The drive shaft 42 is driven by a hydraulic motor 44 carried on one of the outer front extension plates 33. A mounting bracket or support 46 for the bale transfer unit 28 has a pair of transversely spaced side arms 47 the rear ends of which rotatably support the tubular connecting member 43. The forward end of each side arm 47 is of a bifurcated construction to nonrotatably receive therein a support bar 48 mounted on and extended transversely of the machine frame 16 at a position forwardly of and below the axes of the ground wheels 17. The side arms 47 are retained on the support bar 48 by clamping plates 49.

The rear sprocket gears 37 are rotatable on shafts 38 carried in the rear extensions 34. Endless chains 39 trained about the sprockets 36 and 37 for rotation longitudinally of an associated side member 31 carry bale engaging fingers 41. Mounted about the tubular member 43 and between the side arms 47 is a torsion means or coil spring 51 for yieldably holding the transfer unit 28 in a normal or transport position projected generally horizontally rearwardly of the machine 15, with the tubular member constituting the pivotal support for the transfer unit 28. One end of the spring 51 is attached to a side arm 47 of the mounting bracket 46, and its opposite end 53 is attached to a collar 54 which is initially adjustable longitudinally of the tubular member 43 and then fixed to the member 43.

As shown in FIG. 6, the transfer unit 28 and gate 27 are in their relative positions when a formed bale 56 has been completed and is to be discharged from the machine. With the machine 15 stopped in the windrow and the tail gate 27 moved into its open position for releasing formed bale 56 from the chamber 21, the hydraulic motor 44 is automatically operated to actuate the conveyor chains 39 (FIG. 7). The released bale is engaged by the fingers 41 and moved rearwardly of the machine 15 (FIGS. 8 and 9) concurrently with a tilting movement of the transfer unit 28 downwardly and rearwardly to a ground engaged position of the rear ends of the side members 31, each of which is provided with a sled or runner 57. This tilting movement is the result of the weight of the bale 56 counteracting the pressure of the torsion spring 51. The rearward movement of the bale 56, as illustrated in FIG. 9, is continued by the transfer unit 28 until the bale is disposed rearwardly of the machine and clear of the tail gate 27, as shown in FIG. 10.

On discharge of the bale 56 from the transfer unit 28, the unit is automatically returned to its rest or normal position by the torsion spring 51 and the hydraulic motor 44 continues to operate until the tail gate 27 is moved out of its open position. At such time, the hydraulic motor 44 is automatically deactivated. The machine 15 is then advanced in the windrow to initiate its next baling operation without requiring any forward and reverse movements thereof for clearance with the bale 56 sufficient to permit a return of the tail gate 27 to a closed position. By the initial adjustment of the collar 54 the pressure of the torsion spring 51 can be varied to accommodate bales of different weight.

Figure 5:
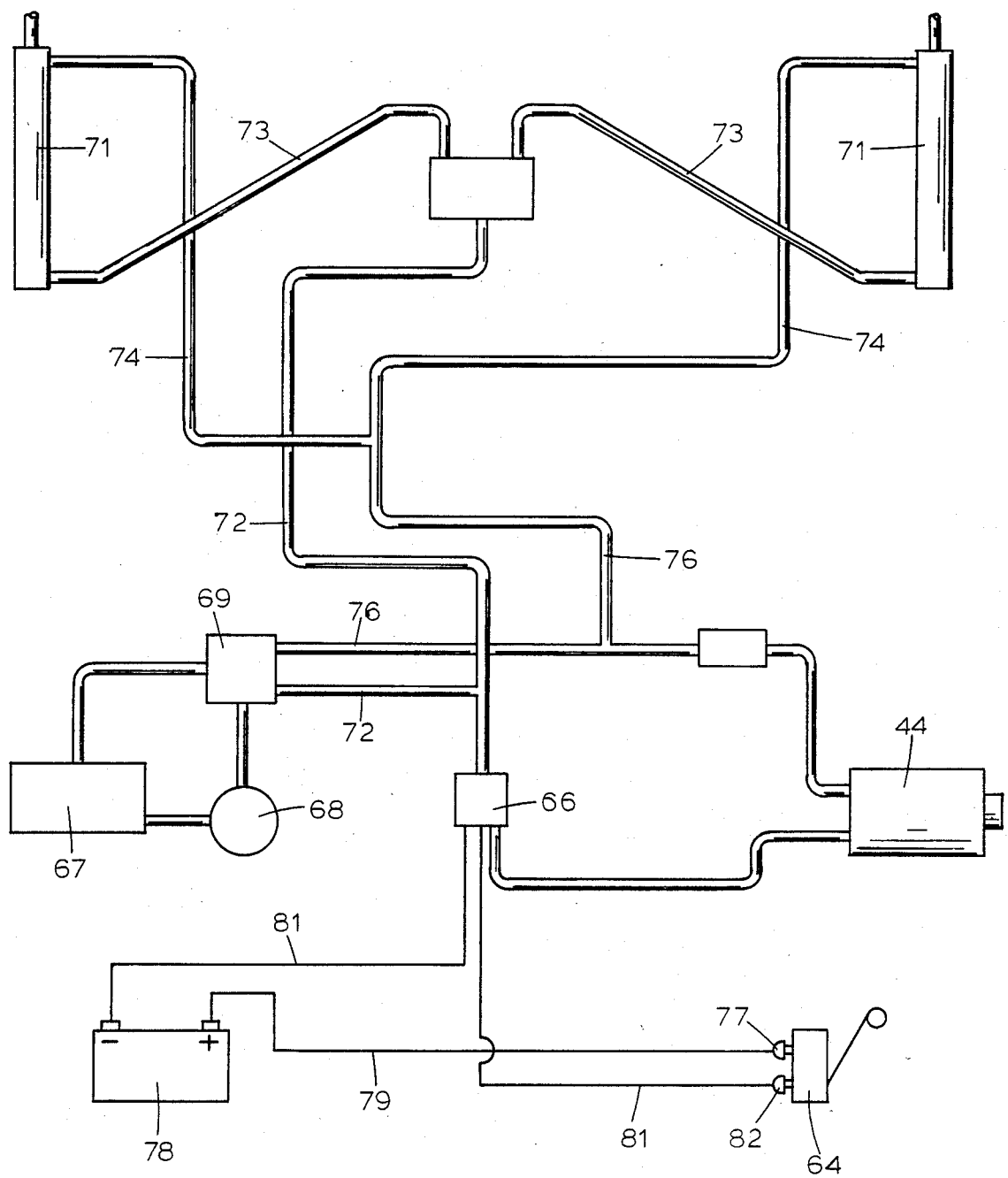
FIG. 5 is a diagrammatic showing of the control system providing for the automatic operation of the bale transfer unit.

The automatic operation of the hydraulic motor 44 is accomplished by a control system that includes a side support arm 58 for the pivoted tail gate 27. (FIGS. 1 and 2). Each support arm 58 is pivoted at 59 to an upright frame member 61 of the main machine frame 16. An actuator plate 62 mounted on one of the side support arms 58 is equipped with a follower unit 63 for engaging a switch unit 64 carried on the upright frame member 61. The switch unit 64 and follower unit 63 are relatively positioned so that the switch unit 64 is closed when the tail gate 27 is pivotally moved into its open bale discharge position. Referring to FIG. 5, the switch unit 64, when closed, opens a normally closed solenoid valve 66 arranged in the hydraulic circuit of the hydraulic motor 44.

The hydraulic circuit for the motor 44 is embodied within the hydraulic system of the towing tractor for the baler machine 15 and which system (FIG. 5) includes an oil reservoir 67, pump 68 and a control valve 69 for operating the tail gate cylinders 71. When a bale is to be discharged from the machine 15, the control valve 69 is actuated to extend the tail gate cylinders 71 which are of double acting type to open the tail gate. Oil under pressure is supplied to the cylinders 71 through line 72 and lines 73 and exhausted from the cylinders 71 through the lines 74 and line 76 until the tail gate 27 is in the bale discharge position therefor.

When the tail gate is in its bale discharge position, the switch unit 64 is engaged by the follower unit 63 to energize the solenoid valve 66 and provide for the bypassing of fluid from the line 72 through the valve 66 and the motor 44 for return to the line 76 and valve 69 to the reservoir 67. The switch unit 64 has a first terminal 77 connected to the tractor battery 78 by conductor 79. The solenoid valve 66 is connected in a conductor 81, attached at one end to the battery 78 and at its opposite end to a second terminal 82 of the switch unit 64. The terminals 77 and 82 are closed by the follower unit 63 to operate the motor 44 when the tail gate 27 is in its bale discharge or open position.

The operation of the motor 44 is maintained until the control valve 69 is operated by the tractor operator to retract the tail gate cylinders 71 and move the follower unit 63 out of engagement with the switch unit 64 to close the solenoid valve 66. On closing of the solenoid valve 66 to deactivate the motor 44, oil under pressure is supplied to the tail gate cylinders 71, through the line 76 and lines 74 and exhausted from the cylinders 71 through the lines 73 and line 74 and control valve 69 into the reservoir 67. The hydraulic motor 44 is thus automatically operated in response to the opening and closing movements of the tail gate 27 and the bale transfer unit 28 is automatically pivoted between its rest position and bale discharge position by the cooperative action of the torsion spring 51 and weight of the bale being ejected from the machine 15.

Although the invention has been described with respect to a preferred embodiment thereof, it is to be understood that it is not to be so limited since changes and modifications can be made therein which are within the full intended scope of this invention as defined by the appended claims.

I claim:

1. In a crop baling machine for forming cylindrical bales comprising:
   (a) a front frame section,
   (b) a rear discharge section pivotally connected to said front section, and
   (c) means for moving said rear section between a closed position to define a bale forming chamber with said front section, and an open position for discharge of a bale from said chamber, the improvement comprising:
   (1) a pivoted bale conveyor unit on said front section projected below said rear discharge section and extended rearwardly therefrom,
   (2) means pivotally supporting said conveyor unit on said front section for movement from a substantially horizontal bale receiving position to a downwardly and rearwardly inclined bale transfer position;
   (3) means yieldably urging said conveyor unit to the bale receiving position therefor,
   (4) transfer means on the conveyor unit for engaging a bale in the bale receiving position for movement rearwardly of the conveyor unit for discharge therefrom to a ground supported position rearwardly of said rear section, said conveyor unit pivotally movable against the action of said yieldable means to said bale transfer position by the weight of a bale thereon,
   (5) means on said conveyor unit for driving said transfer means, and
   (6) means responsive to the movement of the rear section for actuating the transfer driving means only for so long as the rear section is in the open position therefor.

* * * * *